Patented Oct. 14, 1947

2,429,155

UNITED STATES PATENT OFFICE 2,429,155

VINYLIDENE CHLORIDE COMPOSITIONS STABLE TO LIGHT

Raymond F. Boyer, Midland, Mich., assignor to The Dow Chemical Company, Midland, Mich., a corporation of Delaware No Drawing. Application May 4, 1945, Serial No. 592,075

2 Claims. (Cl. 260—92.5)

The present invention relates to compositions of matter comprising polymeric vinylidene chloride products and certain improved combinations of addition agents to serve as light stabilizers for the polymer.

The polymer of vinylidene chloride alone and copolymers of this material with other polymerizable substances have been described in many patents and printed publications during the past few years. The polymer of vinylidene chloride alone and its copolymers and plasticized compositions are herein referred to as "polymeric vinylidene chloride products." These products exhibit a range of desirable properties which make them useful in the formation of molded, extruded or otherwise plastically deformed articles and some of them are sufficiently soluble in organic solvents to be used in the casting of films or as surface coating compositions for the protection of wood, cloth, paper, metals, or other surfaces. All of them have in common the defect of being darkened and somewhat decomposed upon continued exposure to the effects of light, particularly where there is a high concentration of ultraviolet radiations. For this reason, much attention has been given to the selection of addition agents for the incorporation in polymeric vinylidene chloride products to protect the polymer from the adverse effects of light.

Among the more effective of the stabilizing agents heretofore proposed, is 2.2'-dihydroxy-benzophenone, which is disclosed and claimed for this purpose in U. S. Patent No. 2,264,291 which was issued on December 2, 1941, to the present inventor and others. While 2.2'-dihydroxy-benzophenone is an effective stabilizing agent, especially in concentrations of from 1 to 5 per cent, it has the disadvantage of possessing and contributing to polymeric vinylidene chloride products containing it, an intense yellow coloration. When attempts are made to minimize the yellow coloration, due to the 2.2'-dihydroxy-benzophenone, by reducing its concentration in the composition, it is found that the degree of protection afforded by the stabilizer is also reduced. It has also been found that this stabilizing agent, while excellent for the protection of polymeric vinylidene chloride products against artificial sources of ultraviolet radiations, is somewhat less effective in protecting these polymeric products from continued exposure to direct natural sunlight.

It is accordingly among the objects of the present invention to provide a polymeric vinylidene chloride product stabilized against the effects of ultraviolet radiations, from both natural and artificial sources, and exhibiting a minimum coloration due to the stabilizing agents. A related object is to provide a composition wherein at least part of the stabilizing effect is obtained through the use of 2.2'-dihydroxy-benzophenone but in which the amount of said 2.2'-dihydroxy-benzophenone is insufficient to contribute an objectionable intensity of yellow coloration. Another object is to provide a composition as above described wherein a part of the stabilizing effect is due to the presence of 2.2'-dihydroxy-benzophenone and the remainder of the stabilizing action is contributed by colorless addition agents. It is a particular object of the invention to provide polymeric vinylidene chloride products stabilized against the action of ultraviolet radiations wherein the stabilizing agent is a mixture of 2.2'-dihydroxy-benzophenone and a particular type of ester of salicylic acid to be defined more fully hereinafter.

It has now been found that the desired stabilizing effect may be obtained in polymeric vinylidene chloride products and that such compositions may be produced having at most a faint yellow coloration, not unlike that of the natural polymer, by adding to the polymeric product from about 0.3 to about 2 per cent of 2.2'-dihydroxy-benzophenone and from about 1 to about 5 per cent of an ester of salicylic acid having the general formula:

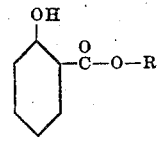

wherein R represents the phenyl and xenyl radicals and the alkyl and dialkyl substitution products thereof wherein the alkyl groups have a total of from 1 to 9 carbon atoms, and hexahydro derivatives of the foregoing radicals. Included within this definition of R are the phenyl, cresyl, xylenyl, ethyl phenyl, isopropyl phenyl, carvacryl, tertiary butyl phenyl, tertiary butyl cresyl, hexyl cresyl, octyl phenyl, octyl cresyl, cyclohexyl, methyl cyclohexyl, dimethyl cyclohexyl, isopropyl cyclohexyl, menthyl, tertiary butyl cyclohexyl, xenyl, phenyl cyclohexyl, cyclohexyl phenyl, tertiary butyl xenyl and numerous other related radicals, all of which are useful in the present invention in the form of the corresponding salicylic acid esters.

The discovery upon which the present invention is based is particularly surprising in view of the fact that the salicylic esters which are here employed together with 2.2'-dihydroxy-benzophenone are not of themselves particularly effective stabilizers for these same vinylidene chloride polymeric bodies. As will be shown in the following table, a mixture of 2.2'-dihydroxy-benzophenone and one of the salicylic acid esters is more effective than either of these agents alone. The following example illustrates the practice of the invention and describes the action of particular concentrations of a few of the many esters of salicylic acid which have been tested and found to be useful in the present invention.

Example

A 20 per cent solution by weight of a copolymer of about 85 per cent vinylidene chloride and about 15 per cent of ethyl acrylate was prepared and divided into several portions. Various combinations of 2.2'-dihydroxy-benzophenone and of salicylic acid esters were added to the several samples, which were then used to cast films 0.004 inch thick on clean glass plates. The dried films were exposed to a high intensity of ultraviolet radiations in a fadeometer for varying periods of time. Portions of the film were periodically removed and tested for their light transmission characteristics, in comparison with samples of untreated film which had been exposed to the same source of light and for the same period. The results are reported in terms of the percent of the available visible light transmitted through the sample before exposure and after exposure for the indicated periods of time.

| Salicylate | Amount, percent | 2.2'-dihydroxy-benzophenone, amount, percent | Percent visible transmission after indicated exposure | | | | |
|---|---|---|---|---|---|---|---|
| | | | 0 hrs. | 68 hrs. | 181 hrs. | 300 hrs. | 410 hrs. |
| Blanks | 0 | 0 | 90 | 45 | 30 | 28 | 25 |
| Do | 0 | 0.5 | 90 | 81 | 65 | 30 | 25 |
| Phenyl | 3 | 0 | 90 | 53 | 27 | 25 | 23 |
| Do | 3 | 0.5 | 90 | 86 | 82 | 66 | 43 |
| o-Xenyl | 3 | 0 | 91 | 66 | 33 | 29 | 20 |
| Do | 3 | 0.5 | 90 | 85 | 79 | 60 | 38 |
| Do | 5 | 0.5 | 90 | 87 | 81 | 68 | 43 |
| p-Xenyl | 3 | 0 | 90 | 74 | 35 | 32 | 27 |
| Do | 3 | 0.5 | 89 | 83 | 81 | 75 | 65 |
| Do | 5 | 0.5 | 90 | 86 | 86 | 85 | 84 |
| Carvacryl | 3 | 0 | 90 | 62 | 42 | 30 | 21 |
| Do | 3 | 0.5 | 90 | 85 | 76 | 65 | 47 |
| Menthyl | 3 | 0 | 91 | 59 | 20 | 15 | 13 |
| Do | 3 | 0.5 | 91 | 88 | 82 | 65 | 37 |
| Do | 5 | 0.5 | 90 | 87 | 82 | 72 | 42 |

Other samples of similar compositions have been exposed to direct sunlight in the subtropics and it is found that the degree of protection afforded by the herein claimed mixture of stabilizing agents is far greater than the amount of protection afforded by either type of stabilizing agent alone. The phenyl, para-tertiary butyl phenyl, and para-xenyl salicylates are among the most effective in the present compositions.

The invention has been illustrated with respect to a film formed from a solution of a soluble copolymer in an organic solvent. It is of equal utility in the protection of other soluble copolymers and of the relatively insoluble copolymers which are usually fabricated by molding, extrusion of other thermal processes. Among the various copolymers of vinylidene chloride known in the art, and useful in the present invention, are those with vinyl chloride, vinyl acetate, styrene, acrylonitrile, methyl methacrylate, and the like. It has been found, in short, that the present invention is useful with any polymeric vinylidene chloride product which tends to decompose or to darken when exposed to light. The invention is not limited to any particular one or few of the vinylidene chloride copolymers, nor is it limited to the use of the particular concentrations of stabilizing agents used in the illustrative example. It has been found that a distinctly advantageous result is obtained when an amount of 2.2'-dihydroxy-benzophenone is employed ranging from about 0.3 per cent up to about 2 per cent of the weight of the polymer, together with an amount of the salicylic acid ester ranging from about 1 per cent up to about 5 per cent of the polymer. The indicated upper limits are imposed for practical, rather than for operative reasons. While larger amounts of the stabilizing agents will also be effective, it has been found unnecessary to employ more of these agents than about 2 per cent of the 2.2'-dihydroxy-benzophenone or about 5 per cent of the salicylic acid ester.

I claim:

1. A composition of matter comprising a polymeric vinylidene chloride product and, as stabilizing agents therefor, from about 0.3 to about 2 per cent of 2.2'-dihydroxy-benzophenone and from about 1 to about 5 per cent of a xenyl salicylate.

2. A composition of matter comprising a polymeric vinylidene chloride product and, as stabilizing agents therefor, from about 0.3 to about 2 per cent of 2.2'-dihydroxy-benzophenone and from about 1 to about 5 per cent of p-xenyl salicylate.

RAYMOND F. BOYER.

REFERENCES CITED

The following references are of record in the file of this patent:

UNITED STATES PATENTS

| Number | Name | Date |
|---|---|---|
| 2,371,618 | Hanson | Mar. 20, 1945 |
| 2,157,068 | Carruthers | May 2, 1939 |